· US009340210B2

(12) United States Patent
Ishikawa et al.

(10) Patent No.: US 9,340,210 B2
(45) Date of Patent: May 17, 2016

(54) CONTROL DEVICE FOR AUTOMATIC TRANSMISSION FOR VEHICLE

(71) Applicant: HONDA MOTOR CO., LTD., Tokyo (JP)

(72) Inventors: Yutaka Ishikawa, Wako (JP); Kazuhiko Imamura, Wako (JP); Akio Muto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/417,431

(22) PCT Filed: Jun. 25, 2013

(86) PCT No.: PCT/JP2013/067422
§ 371 (c)(1),
(2) Date: Jan. 26, 2015

(87) PCT Pub. No.: WO2014/017239
PCT Pub. Date: Jan. 30, 2014

(65) Prior Publication Data
US 2015/0191174 A1   Jul. 9, 2015

(30) Foreign Application Priority Data

Jul. 27, 2012   (JP) .................................. 2012-166971

(51) Int. Cl.
*F02D 41/00*   (2006.01)
*F16H 59/46*   (2006.01)
(Continued)

(52) U.S. Cl.
CPC ........... *B60W 30/194* (2013.01); *B60W 10/026* (2013.01); *B60W 10/06* (2013.01);
(Continued)

(58) Field of Classification Search
CPC ............. B60W 30/194; F02D 41/0002; F16H 2059/465; F16H 61/14
See application file for complete search history.

(56) References Cited

U.S. PATENT DOCUMENTS 5,515,272 A * 5/1996 Sakai ...................... F16H 61/12
  180/273
5,733,223 A * 3/1998 Matsubara ............ B60W 10/06
  477/169

(Continued)

FOREIGN PATENT DOCUMENTS

JP   01-98759 A   4/1989
JP   10-47098 A   2/1998
(Continued)

OTHER PUBLICATIONS

International Search Report dated Jul. 30, 2013 corresponding to International Patent Application No. PCT/JP2013/067422 and English translation thereof.

*Primary Examiner* — Tisha Lewis
(74) *Attorney, Agent, or Firm* — Squire Patton Boggs (US) LLP

(57) ABSTRACT

A sticking condition of a lock-up clutch is judged by an oil temperature of hydraulic oil and a slip ratio of the LC. An intake air amount of an engine is increased while the LC is judged to be in a sticking condition, and the increase of the intake air amount of the engine is terminated when the judgment to be in the sticking condition is canceled. This enables to effectively prevent a rotation speed of the engine from decelerating in a range (timing) where a sticking of the LC occurs, and further prevent the rotation speed of the engine from rapidly accelerating in a range where a sticking of the LC does not occur. Therefore, decelerations of engine rotation speed due to a sticking of the lock-up clutch and rapid accelerations of engine rotation speed after the sticking has been eliminated can both be prevented.

2 Claims, 4 Drawing Sheets

(51) Int. Cl.
*F16H 61/14* (2006.01)
*B60W 30/194* (2012.01)
*F02D 9/02* (2006.01)
*F02D 29/02* (2006.01)
*F02D 41/02* (2006.01)
*B60W 10/02* (2006.01)
*B60W 10/06* (2006.01)
*B60W 30/188* (2012.01)

(52) U.S. Cl.
CPC ............ *B60W30/1884* (2013.01); *F02D 9/02* (2013.01); *F02D 29/02* (2013.01); *F02D 41/0002* (2013.01); *F02D 41/022* (2013.01); *F16H 61/14* (2013.01); *F16H 2059/465* (2013.01); *Y02T 10/42* (2013.01); *Y10T 477/6333* (2015.01)

(56) References Cited

U.S. PATENT DOCUMENTS

| | | | | |
|---|---|---|---|---|
| 5,989,156 | A * | 11/1999 | Matsubara | B60W 10/02 477/169 |
| 2010/0145584 | A1* | 6/2010 | Kojima | F16H 61/143 701/68 |
| 2014/0195086 | A1* | 7/2014 | Yoshikawa | B60W 20/40 701/22 |

FOREIGN PATENT DOCUMENTS

| | | |
|---|---|---|
| JP | 10-159612 A | 6/1998 |
| JP | 2006-037917 A | 2/2006 |
| JP | 2012-062998 A | 3/2012 |

\* cited by examiner

CONTROL DEVICE FOR AUTOMATIC TRANSMISSION FOR VEHICLE

TECHNICAL FIELD

The present invention relates to a control device for an automatic transmission for a vehicle having a torque converter provided with a lock-up clutch.

BACKGROUND ART

As described in Patent Documents 1 and 2, in an automatic transmission for a vehicle, a lock-up clutch capable of mechanically coupling an output shaft of an engine to an input shaft of the automatic transmission is provided in a torque converter. In addition, by engaging the lock-up clutch under certain conditions, engine rotation speed is kept low to improve fuel consumption.

Generally, the lock-up clutch is engaged when the automatic transmission is set to a predetermined gear shift stage. However, shocks and torque fluctuations transmitted between the input shaft and the output shaft cannot be absorbed when the lock-up clutch is fully engaged. Accordingly, depending on driving conditions of the vehicle, slip control is performed to slip the lock-up clutch without being fully engaged. In this slip control, for example, depending on driving conditions, a target slip ratio of the lock-up clutch is recorded corresponding to a gear shift stage, and an engaging capacity of the lock-up clutch is controlled (controlled by feedback control) so that an actual slip ratio can be equivalent to the target slip ratio.

RELATED ART DOCUMENTS

Patent Documents

[Patent Document 1] Japanese Unexamined Patent Application Publication No. 2012-062998
[Patent Document 2] Japanese Unexamined Patent Application Publication No. 01-098759

DISCLOSURE OF THE INVENTION

Problems to be Solved by the Invention

Incidentally, in a transmission with a lock-up clutch having a multiple plate clutch structure formed by alternately laminating a plurality of clutch plates disposed on a member on an engine side and another plurality of clutch plates disposed on a member on an automatic transmission side, hydraulic oil (ATF) having a low viscosity remains in a gap between clutch plates. As a result, one of the clutch plates of the lock-up clutch is dragged by another adjacent clutch plate, thereby rotating together at a low temperature. (This is what is called a sticking phenomenon.) In other words, in the lock-up clutch having a multiple plate clutch structure, the hydraulic oil at a low temperature exists in a groove of the clutch plates (a clutch groove), whereby the clutch plates stick together. Consequently, especially in a condition that hydraulic oil temperature is low, for example, immediately after an engine is started in an extremely low temperature environment, in a load fluctuation such as at an in-gear time when the transmission switches gear shift stages, a friction force (a friction) occurs to the clutch plates of the lock-up clutch. This causes a problem that engine rotation speed is decelerated.

Accordingly, in conventional controls, at a first in-gear time after the engine is started, that is, when a sticking readily occurs to the lock-up clutch, intake air amount of the engine is increased more than in a normal operating condition, thereby restraining engine rotation speed to be decelerated. However, this control method has problems such as causing rapid accelerations (what is called an engine racing) in engine rotation speed even after the sticking of the lock-up clutch due to the increase in the intake air amount of the engine. Rapid accelerations in engine rotation speed are caused by a condition that the engine continuously takes in the increased amount of intake air.

It should be noted that in the above-described conventional control method, the intake air amount of the engine is increased only at the first in-gear time after the engine is started, that is, in a condition that the friction due to the sticking of the lock-up clutch is high because of a low hydraulic oil temperature. The intake air amount of the engine is not increased at second and subsequent in-gear times after the engine is started, that is, in a condition that the friction caused by the sticking of the lock-up clutch is lowered due to the gradually-rising temperature of hydraulic oil.

However, even in this control, at the first in-gear time after the engine is started, the engine rotation speed might rapidly accelerate after the sticking of the lock-up clutch is eliminated due to the increased intake air amount of the engine.

The present invention was achieved in view of the above-described problems, and the purpose of the invention is to provide a control device for an automatic transmission allowing a relatively simple control to prevent both decelerations of engine rotation speed due to a sticking of lock-up clutch and rapid accelerations in engine rotation speed after the sticking is eliminated.

Means of Solving the Problems

The present invention for solving the above-described problems is a control device for an automatic transmission having a torque converter (3) provided with a lock-up clutch (40) disposed between an engine (1) and the automatic transmission (2) mounted on a vehicle, a hydraulic control device (6) for supplying pressure-regulated hydraulic oil to a transmission mechanism (2a) and the torque converter (3) included in the automatic transmission (2), and a controller (5) configured to control settings of gear ratios set by the transmission mechanism (2a) and engaging conditions of the lock-up clutch (40) by controlling supply oil pressures of the hydraulic control device (6). The controller (5) has an oil temperature judging means (208, 5) for judging a hydraulic temperature (T), a slip ratio calculating means (5) for calculating slip ratios of the lock-up clutch (40) based on an output rotation speed of the engine (1) and an input rotation speed of the automatic transmission (2), a sticking judgment means (5) for judging whether the lock-up clutch (40) is in a sticking condition or not based on the hydraulic oil temperature (T) judged by the oil temperature judging means (5) and a slip ratio (S) calculated by the slip ratio calculating means (5), and an intake air amount variable means (9, 5) for varying intake air amount of the engine (1) based on a judgment of the sticking judgment means (5). The oil temperature judging means (5) judges that the lock-up clutch (40) is in a sticking condition when the hydraulic oil temperature (T) is equal to or lower than a predetermined value (T1) and the slip ratio (S) calculated by the slip ratio calculating means (5) is equal to or higher than a predetermined value (S1). While the lock-up clutch (40) is judged to be in a sticking condition by the sticking judgment means (5), the intake air amount variable means (5) performs a control to increase the intake air amount of the engine (1) more than in a normal operating condition.

When the judgment of the sticking condition is canceled, the intake air amount variable means (5) performs a control to terminate the increase in intake air amount of the engine (1).

According to the control device for the automatic transmission of the present invention, it is judged whether the lock-up clutch is in a sticking condition or not by judging a hydraulic oil temperature judged by the oil temperature judging means and a slip ratio of the lock-up clutch calculated by the slip ratio calculating means. The intake air amount of the engine is increased while the lock-up clutch is judged to be in the sticking condition, and the increase in intake air amount of the engine is terminated when the judgment to be in the sticking condition is canceled. Accordingly, decelerations of engine rotation speed can be effectively prevented by increasing the intake air amount of the engine in a range (at a timing) where a sticking of the lock-up clutch occurs, whereas rapid accelerations in engine rotation speed (what is called an engine racing) can be prevented by terminating the increase in intake air amount of the engine in a range where the sticking of the lock-up clutch does not occur (a range where the sticking has been eliminated).

In addition, the lock-up clutch (40) may have a multiple plate clutch structure formed by alternately laminating a plurality of clutch plates (41a) disposed on a member (44) on an engine (1) side and another plurality of clutch plates (41b) disposed on a member (42) on an automatic transmission (2) side.

In the lock-up clutch having the multiple plate clutch structure, a sticking of the lock-up clutch can easily occur at a low temperature due to low viscosity hydraulic oil remaining in a gap between clutch plates, whereas, by performing the above-described controls according to the present invention, both decelerations of engine rotation speed accompanied by the sticking of the lock-up clutch and rapid accelerations in engine rotation speed can be prevented. It should be noted that the above-described characters in parentheses represent, by way of example, reference characters of components of embodiments to be described later.

Effects of the Invention

According to a control device for an automatic transmission for a vehicle of the present invention, a simple control can effectively prevent decelerations of engine rotation speed while a sticking of a lock-up clutch occurs and rapid accelerations in engine rotation speed (an engine racing) after the sticking of the lock-up clutch has been eliminated.

DESCRIPTION OF PREFERRED EMBODIMENTS

Figure 1:
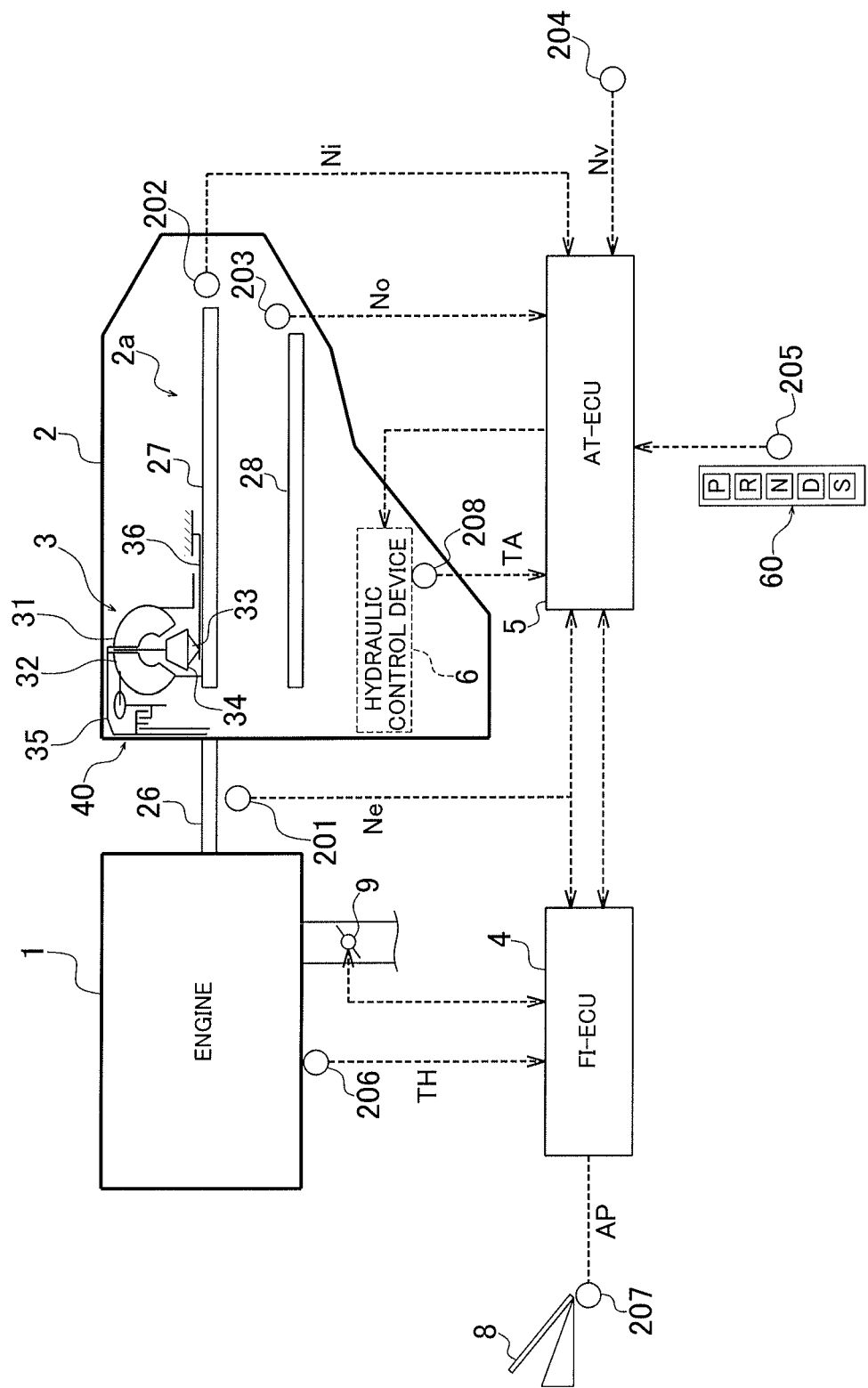
FIG. 1 is a schematic view of a vehicle driving system provided with a control device for an automatic transmission in accordance with an embodiment of the present invention.
Figure 2:
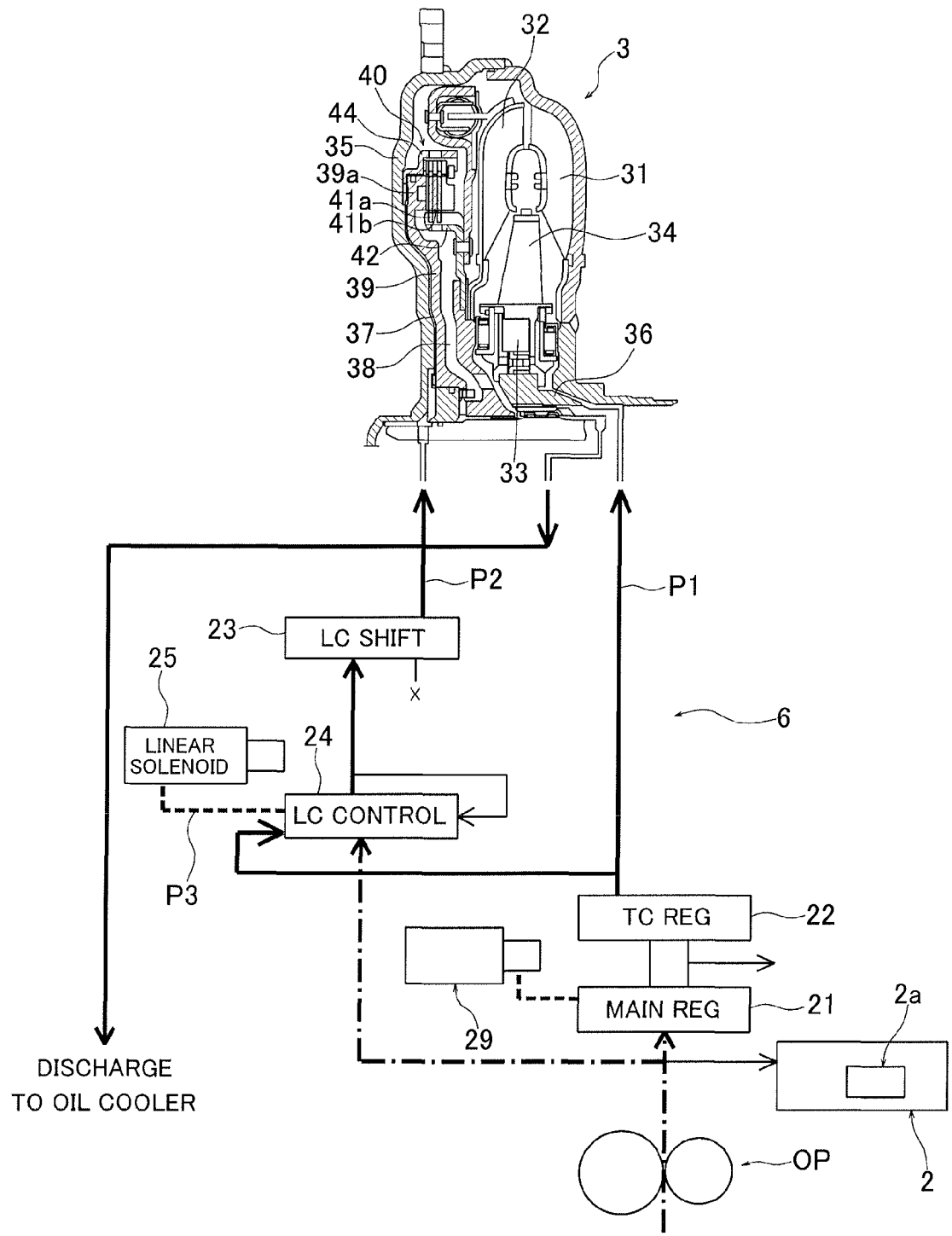
FIG. 2 shows a hydraulic control device (a hydraulic circuit) for controlling a torque converter and a transmission mechanism.

Embodiments of the present invention are described below in detail referring to attached drawings. FIG. 1 is a schematic view of a vehicle driving system provided with a control device for an automatic transmission in accordance with an embodiment of the present invention. FIG. 2 shows a torque converter 3 and a hydraulic control device (a hydraulic circuit) 6 described below. As shown in FIG. 1, a vehicle of the present embodiment includes an engine 1 and an automatic transmission 2 connected to the engine 1 via the hydraulic torque converter 3. The automatic transmission 2 has a stepped transmission mechanism 2a capable of setting a plurality of gear shift stages having mutually different gear ratios (for example, sixth speed stages for forward travel and one speed stage for reverse travel). In addition, the vehicle is provided with FI-ECU 4 for controlling the engine 1, AT-ECU 5 (a controller) for controlling the automatic transmission 2 including the torque converter 3, and the hydraulic control device 6 for controlling rotational drive of the torque converter 3, engaging controls of the lock-up clutch 40 described below, and engaging and a disengaging of a plurality of friction engaging elements included to the transmission mechanism 2a of the automatic transmission 2.

An rotational output of the engine 1 is output to a crank shaft (an output shaft of the engine 1) 26. Rotations of the crank shaft 26 is transmitted to a main shaft 27 of the automatic transmission 2 via the torque converter 3.

The transmission mechanism 2a of the automatic transmission 2 includes a plurality of gear trains and a plurality of clutches (friction engaging elements) corresponding to a plurality of gear shift stages and disposed between the main shaft 27 and a counter shaft 28. The each gear train is configured with a pair of a drive gear train and a driven gear train. In addition, detailed configurations of the transmission mechanism 2a are not characteristic parts of the present invention, therefore, detailed descriptions by using a skeleton figure or other figures are omitted. A person skilled in the art can, however, properly apply a configuration of a known transmission mechanism to the present embodiment.

A crank shaft rotation speed sensor 201 for detecting a rotation speed of the crank shaft 26 (the engine 1) Ne is disposed near the crank shaft 26 of the automatic transmission 2. A main shaft rotation speed sensor 202 for detecting a rotation speed of the main shaft 27 (an input shaft rotation speed of the automatic transmission 2) Ni is disposed near the main shaft 27. A counter shaft rotation speed sensor 203 for detecting a rotation speed of a counter shaft 28 (an output shaft rotating speed of the automatic transmission 2) No is disposed near the counter shaft 28. Rotation speed data detected by the each rotation speed sensor 201 to 203 are output to the AT-ECU 5. In addition, a vehicle speed sensor 204 for detecting a vehicle speed Nv is provided. The data of the vehicle speed detected by the vehicle speed sensor 204 is output to the AT-ECU 5. Furthermore, a throttle opening sensor 206 for detecting a throttle opening TH of the engine 1 is provided. The throttle opening data detected by the throttle opening sensor 206 are output to the FI-ECU 4. In addition, an intake valve 9 for adjusting an air amount (an intake air amount) supplied to the engine 1 is provided. An operation of the intake valve 9 is controlled by commands of the FI-ECU 4.

An accelerator pedal opening sensor 207 for detecting an opening of an accelerator pedal 8 (an accelerator pedal opening) AP is disposed near the accelerator pedal 8. Accelerator pedal opening data detected by the accelerator pedal opening sensor 207 is output to the FI-ECU 4. In addition, an oil temperature sensor 208 for detecting an oil temperature TA of hydraulic oil of the automatic transmission 2 (hydraulic control device 6) (ATF) is disposed near an unshown oil tank in the hydraulic control device 6. The data of the temperature (the oil temperature) of ATF detected by the oil temperature sensor 208 is output to the AT-ECUS.

In addition, the vehicle of the present embodiment is provided with a shift device 60 operated through a shift lever by a driver. As shown in FIG. 1, for example, there are P (parking), R (reverse traveling), N (neutral), D (forward traveling in an automatic gear shift mode (normal mode)), S (forward traveling in a sport mode), and so on as a position of the shift lever (unshown) in the shift device 60. A shift lever position sensor 205 is disposed near the shift device 60. The shift lever position sensor 205 detects positions of the shift lever operated by a driver.

The FI-ECU 4 controls outputs of the engine 1, namely, the rotating speed Ne of the engine 1 based on detected data input from the above-described each sensor 202 to 208 and various data input from the AT-ECU 5.

Rotation torques of the main shaft 27 is transmitted to the counter shaft 28 via the clutches, the gear trains, and the gear trains of a secondary shaft and an idle shaft unshown in FIG. 1. In addition, rotation torques of the counter shaft 28 is transmitted to drive wheels of the vehicle via the gear trains and a differential mechanism unshown in FIG. 1.

The torque converter 3 transmits torques via fluid (the hydraulic oil). The torque converter 3 is, as shown in FIG. 1 and FIG. 2, provided with a front cover 35, a pump impeller 31 integrally formed with the front cover 35, a turbine impeller (a turbine runner) 32 disposed opposite to the pump impeller 31 and between the front cover 35 and the pump impeller 31, and a stator impeller 34 interposed between the pump shaft 31 and the turbine impeller 32 and rotatably supported on a stator shaft (a fixed shaft) 36 via a one-way clutch 33. As shown in FIG. 1, the crank shaft 26 is connected to the pump impeller 31 of the torque converter 3 via the front cover 35. The turbine impeller 32 is connected to the main shaft (the input shaft of the automatic transmission 2) 27. The hydraulic oil (ATF: Automatic Transmission Fluid) is sealed in a container formed by the front cover 35 and the pump impeller 31 (in a first oil chamber 37 and a second oil chamber 38 described below).

The lock-up clutch 40 is disposed between the turbine impeller 32 and the front cover 35. The lock-up clutch 40 of the present embodiment is provided with a clutch hub 42 disposed on a side of the turbine impeller 32 and a clutch drum 44 disposed on a side of the front cover 35, and has the multiple plate clutch structure alternately laminating a plurality of clutch plates 41a attached to the clutch hub 42 and the other plurality of clutch plates 41b attached to the clutch drum 44. In addition, an inner space of the front cover 35 is partitioned to the first oil chamber 37 on a side of the front cover 35 and the second oil chamber 38 on a side of the turbine impeller 32 by a movable member 39 having a piston 39a. The movable member 39 is capable of moving in accordance with hydraulic changes of the first oil chamber 37 and the second oil chamber 38, and press engagements of the clutch plates 41a and 41b and a cancellation thereof can be switched by moving the movable member 39.

The lock-up clutch 40 is, therefore, engaged (fastened) when an oil pressure of the first oil chamber 37 becomes higher than oil pressure of the second oil chamber 38 by controlling the hydraulic control device 6, whereas the engagement is canceled when the oil pressure of the first oil chamber 37 becomes lower than oil pressure of the second oil chamber 38.

The hydraulic control device (the hydraulic circuit) 6 has an oil pump OP supplied with hydraulic oil of an oil tank (unshown), a regulator valve 21 for regulating a supply pressure from the oil pump OP to a line pressure, a torque converter pressure-regulating valve 22 for further regulating the hydraulic oil pressure regulated by the regulator valve 21 and supplying the torque converter 3 with the hydraulic oil, an LC shift valve 23 for controlling a supply of the hydraulic oil pressure-regulated by the torque converter pressure-regulating valve 22 to the first oil chamber 37 and the second oil chamber 38, an LC control valve 24 for controlling an oil pressure of the hydraulic oil supplied to the second oil chamber 38, and a linear solenoid 25 for supplying the LC control valve 24 with a signal pressure.

The AT-ECU 5 controls the hydraulic control device 6 based on the detected data input from each sensor 202 to 208 and the various data input from the FI-ECU 4. The hydraulic control device 6, therefore, supplies each of a plurality of unshown friction engaging elements (clutches) included to the transmission mechanism 2a of the automatic transmission 2 with a hydraulic oil of a line pressure PL (a hydraulic pressure). This enables to selectively engage and disengage (operate to engage) the plurality of friction engaging elements and set to one of a plurality of gear shift stages.

In addition, the hydraulic control device 6 supplies the pump impeller 31 of the torque converter 3 with hydraulic oil of the hydraulic pressure, thereby controls the slip ratio showing how much rotational driving of the crank shaft 26 is transmitted to the main shaft 27. And the oil chambers 37 and 38 of the lock-up clutch 40 is supplied with the hydraulic oil of the hydraulic pressure, thereby controls to engage (fasten) the lock-up clutch 40 under a predetermined condition, for example, at a cruise traveling of the vehicle.

In the lock-up clutch 40, a lock-up capacity (an engaging force of the lock-up clutch 40) is generated by a differential pressure of the first oil chamber and the second oil chamber. This means that a discharge pressure of hydraulic oil (the line pressure) discharged from the oil pump OP is regulated by the torque converter pressure-regulating valve 22, and the regulated hydraulic oil flows into the first oil chamber 37 of the lock-up clutch 40 via an inner portion of the torque converter 3, as shown in an inner pressure P1 of FIG. 2. On the other hand, the hydraulic oil regulated by the torque converter pressure-regulating valve 22 is regulated to a necessary pressure by the LC control valve 24, and flows into the second oil chamber 38 of the lock-up clutch 40 via the LC shift valve 23, as shown in a piston pressure P2 of FIG. 2.

The LC shift valve 23 switches on/off (engaging/disengaging) of the lock-up clutch 40 by controlling on/off of an oil pressure toward the second oil chamber 38. On the other hand, a linear solenoid pressure P3 as a pilot pressure is applied to the LC control valve 24. The inner pressure of the second oil chamber 38 is controlled by changing regulating points of the LC control valve 24 by the linear solenoid pressure P3. Accordingly, an engaging force of the lock-up clutch 40 is adjusted and a slip control is performed.

In addition, the hydraulic control device 6 supplies the main shaft 27, the counter shaft 28, and the like with lubrication oil for lubricating not only the main shaft 27 and the counter shaft 28 of the shift mechanism 2a but also an unshown secondary shaft and an idle shaft.

Also, in the lock-up clutch 40 of above-described configuration, as described above, the hydraulic oil (ATF) having a low viscosity remains in a gap between or among a plurality of clutch plates of the lock-up clutch 40. As a result, one of the clutch plates of the lock-up clutch 40 is dragged by another adjacent clutch plate and rotated together at a low temperature. (This is what is called a sticking phenomenon.) Accordingly, especially in a condition that hydraulic oil temperature is low, for example, immediately after an engine is started in an extremely low temperature environment, in a load fluctuation such as at an in-gear time in the transmission mechanism 2a, a friction force (a friction) occurs to the clutch plates 41a and 41b of the lock-up clutch 40. This causes a problem that a rotation speed of the engine 1 is decelerated.

To deal with these problems, the control device of the present embodiment increases an intake air amount of the engine 1 at a time of in-gear by the transmission mechanism 2a more than on a time of normal operating to restrain the rotation speed decelerations of the engine 1 due to a sticking of the lock-up clutch 40. In this case, whether the lock-up clutch 40 is in a sticking condition or not is judged based on a temperature of the hydraulic oil supplied to the transmission mechanism 2a and the lock-up clutch 40 and a slip ratio of the lock-up clutch 40. In addition, the slip ratio of the lock-up clutch 40 is calculated from a rotation speed of the engine 1 detected by the crank shaft rotating speed sensor 201 and a rotation speed of the main shaft (input shaft) 27 of the automatic transmission 2 detected by the main shaft rotating speed sensor 202. While the lock-up clutch 40 is judged to be in a sticking condition, an intake air amount of the engine 1 is increased more than in a normal operating condition, whereas the increase in intake air amount of the engine 1 is terminated when the judgment to be in the sticking condition is canceled. These controls are referred to as a preventive control of engine rotation speed decelerations hereinafter, and these controls are described in detail.

Figure 3:
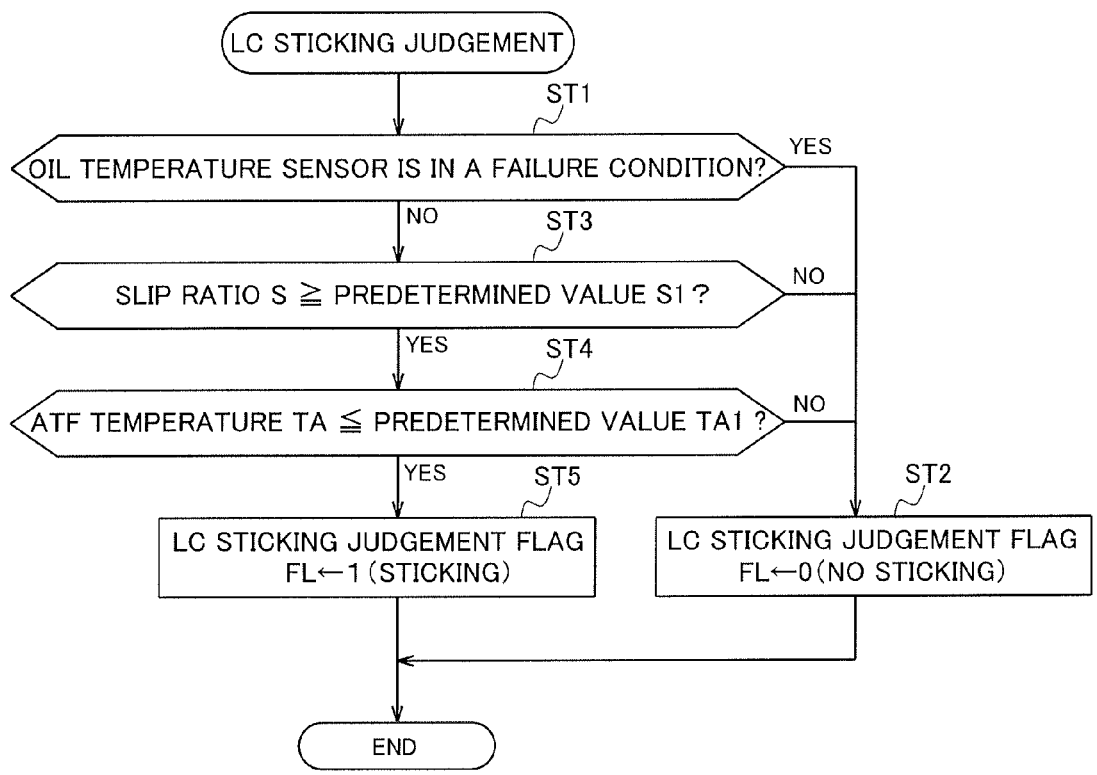
FIG. 3 is a flow chart for describing a procedure of a sticking judgment of a lock-up clutch in a preventive control of engine rotation speed decelerations.
Figure 4:
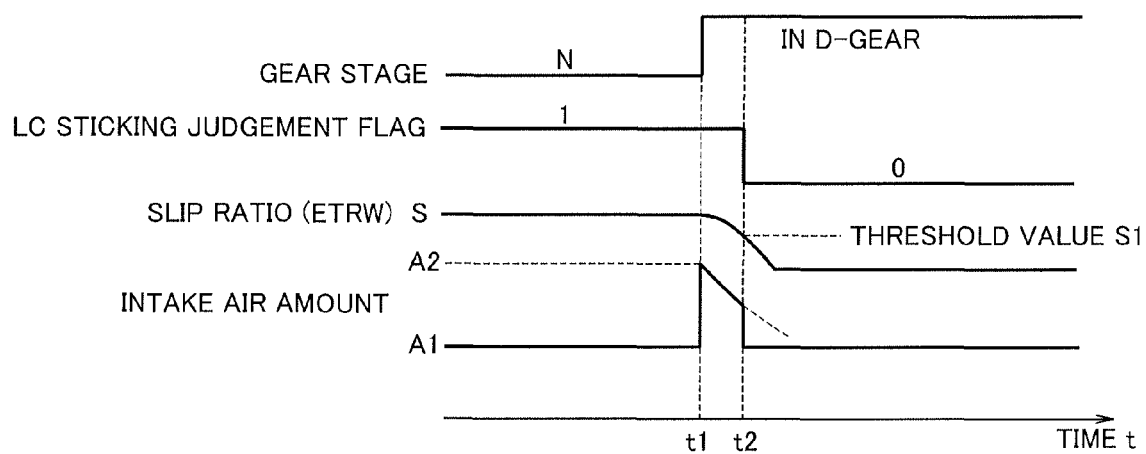
FIG. 4 is a timing chart for showing changes in various values when preventing engine rotation speed from decelerating.

FIG. 3 is a flow chart for describing a procedure of a sticking judgment of the lock-up clutch 40 in a preventive control of the above described engine rotation speed decelerations. In addition, FIG. 4 is a timing chart for showing changes in various values when performing the preventive control of engine rotation speed decelerations. In the timing chart of FIG. 4, shown is each change of a gear stage (a gear shift stage) set by the transmission mechanism 2a, a sticking judgment flag of the lock-up clutch 40, a slip ratio of the lock-up clutch 40, and an intake air amount of the engine 1.

In the flow chart of FIG. 3, first of all, it is judged whether the oil temperature sensor 208 for detecting an oil temperature of hydraulic oil is in a failure condition or not (Step ST1). As a result, when the oil temperature sensor 208 is in a failure condition (YES), the sticking judgment flag FL of the lock-up clutch 40 is determined to be FL←0 (no sticking) (Step ST2). On the other hand, when the oil temperature sensor 208 is not in a failure state (NO), it is continuously judged whether the slip ratio S of the lock-up clutch 40 is a high slip ratio equal to or higher than a predetermined value S1 (S≥S1) or not (Step ST3). As a result, when the slip ratio (ETRW) S of the lock-up clutch 40 is not a high slip ratio equal to or higher than the predetermined value S1 (NO), the sticking judgment flag FL of the lock-up clutch 40 is determined to be FL←0 (no sticking) (Step ST2). On the other hand, when the slip ratio S of the lock-up clutch 40 is a high slip ratio equal to or higher than the predetermined value S1 (YES), it is continuously judged whether the oil temperature TA of the hydraulic oil (ATF) detected by the oil temperature sensor 208 is a low temperature equal to or lower than a predetermined value TA1 (TA≤TA1) or not (Step ST4). As a result, when the oil temperature TA of the hydraulic oil is not a low temperature equal to or lower than the predetermined value TA1 (NO), the sticking judgment flag FL of the lock-up clutch 40 is determined to be FL←0 (no sticking) (Step ST2). On the other hand, when the oil temperature TA of the hydraulic oil is a low temperature equal to or lower than the predetermined value TA1 (YES), the sticking judgment flag FL is determined to be FL←1 (sticking) (Step ST5).

Moreover, a control for varying an intake air amount of the engine 1 is performed based on a result of the sticking judgment of the lock-up clutch 40. That is, as shown in the timing chart of FIG. 4, at the time of in-gear (a time t1) when a gear stage (a gear shift stage) of the transmission mechanism 2a switches to Drive (D) from Neutral (N), the intake air amount of the engine 1 is an intake air amount A2 increased more than an intake air amount A1 in a normal operation when the sticking judgment flag FL of the lock-up clutch 40 is FL←1 (sticking) This enables to prevent a rotation speed of the engine 1 from decelerating even when the lock-up clutch 40 is in a sticking condition. Subsequently, at a time t2, when the sticking judgment flag FL of the lock-up clutch 40 switches to FL←0 (no sticking) since the slip ratio S of the lock-up clutch becomes lower than the predetermined value S1, accordingly, the control for increasing the intake air amount of the engine 1 is terminated. This means that the intake air amount of the engine 1 is restored to the intake air amount A1 in a normal operation. This enables to effectively prevent the rotation speed of the engine 1 from rapidly accelerating (prevent the so-called a racing of the engine 1).

As described above, the control device for the automatic transmission of the present embodiment detects the sticking condition of the lock-up clutch 40 from the oil temperature TA of the hydraulic oil detected by the oil temperature sensor 208 and the calculated slip ratio of the lock-up clutch 40, and the sticking of the lock-up clutch 40 is judged based thereon. An intake air amount of the engine 1 is increased more than in a normal operation while the lock-up clutch 40 is determined to be in the sticking condition, whereas the increase of the intake air amount of the engine 1 is terminated when the judgment to be in the sticking condition is canceled. This effectively prevents rotation speed of the engine 1 from decelerating due to an increase of the intake air amount of the engine 1 in a range (timing) where the sticking of the lock-up clutch 40 occurs, and enables to prevent rotation speed of the engine 1 from rapidly accelerating (prevent the so-called racing of the engine 1) by stopping the increase of the intake air amount of the engine 1 in a range where the sticking of the lock-up clutch 40 does not occur (where the sticking has been canceled).

Though the embodiments of the present invention ware described above, the present invention is not limited to the above-described embodiments, and various deformations can be achieved within a scope of the technical ideas described in Claims, Specification, and Drawings. For example, though the transmission mechanism of the automatic transmission of the above-described embodiment is a stepped transmission mechanism capable of setting a plurality of gear shift stages, the transmission mechanism of the automatic transmission according to the present invention is not limited to a stepped transmission mechanism, and may be a continuously variable transmission mechanism capable of continuously setting gear ratios in accordance with a supply oil pressure of an hydraulic control device.

The invention claimed is:
1. A control device for an automatic transmission for a vehicle, comprising:
   a torque converter with a lock-up clutch disposed between an engine and an automatic transmission mounted on a vehicle;
   a hydraulic control device for supplying a transmission mechanism and the torque converter of the automatic transmission with pressure-regulated hydraulic oil; and
   a controller configured to control settings of gear ratios set by the transmission mechanism and engaging conditions of the lock-up clutch by controlling a supply oil pressure of the hydraulic control device;

wherein the controller further comprises:

an oil temperature judging means for judging an oil temperature of the hydraulic oil;

a slip ratio calculating means for calculating a slip ratio of the lock-up clutch based on an output rotation speed of the engine and an input rotation speed of the automatic transmission;

a sticking judgment means for judging whether the lock-up clutch is in a sticking condition or not based on the oil temperature of the hydraulic oil judged by the oil temperature judging means and the slip ratio calculated by the slip ratio calculating means; and an intake air amount variable means for varying an intake air amount of the engine based on a judgment of the sticking judgment means;

wherein the oil temperature judging means judges the lock-up clutch is in a sticking condition when the oil temperature of the hydraulic oil is equal to or lower than a predetermined value, and the slip ratio calculated by the slip ratio calculating means is equal to or higher than a predetermined value;

wherein the intake air amount variable means performs a control to increase an intake air amount of the engine more than in a normal operating condition while the lock-up clutch is judged to be in a sticking condition by the sticking judgment means, whereas an increase of the intake air amount of the engine is terminated when the judgment to be in the sticking condition is canceled.

2. The control device for the automatic transmission according to claim 1, wherein the lock-up clutch has a multiple plate clutch structure formed by alternately laminating a plurality of clutch plates disposed on a member on a side of the engine and another plurality of clutch plates disposed on a member on a side of the automatic transmission.

* * * * *